United States Patent [19]
Horii

[11] Patent Number: 6,115,243
[45] Date of Patent: Sep. 5, 2000

[54] PORTABLE ELECTRONIC APPARATUS

[75] Inventor: Yasuyuki Horii, Tokyo, Japan

[73] Assignee: Kabushiki Kaisha Toshiba, Kawasaki, Japan

[21] Appl. No.: 08/962,450

[22] Filed: Oct. 31, 1997

[30] Foreign Application Priority Data

Nov. 1, 1996 [JP] Japan .................................. 8-292012

[51] Int. Cl.[7] ...................................................... G06F 1/16
[52] U.S. Cl. ........................................... 361/684; 361/686
[58] Field of Search ................................... 361/684, 686, 361/724, 727, 816, 818; 174/51; 379/433

[56] References Cited

U.S. PATENT DOCUMENTS 4,777,565  10/1988  McIntosh ................................ 361/424
5,574,625  11/1996  Ohgami et al. ........................ 361/684
5,768,098   6/1998  Murayama ............................. 361/684

*Primary Examiner*—Leo P. Picard
*Assistant Examiner*—Tung Minh Bui
*Attorney, Agent, or Firm*—Finnegan, Henderson, Farabow, Garrett & Dunner, L.L.P.

[57] ABSTRACT

A housing of a personal computer is provided with a pack holding portion for alternatively holding a CD-ROM drive or a floppy disk drive. The pack holding portion is defined by a recess opening in the bottom and side walls of the housing, and a loading port of an optional part holding portion for holding an expansion memory, opens in a base plate of the pack holding portion. The loading port is closed by a removable metallic cover.

6 Claims, 9 Drawing Sheets

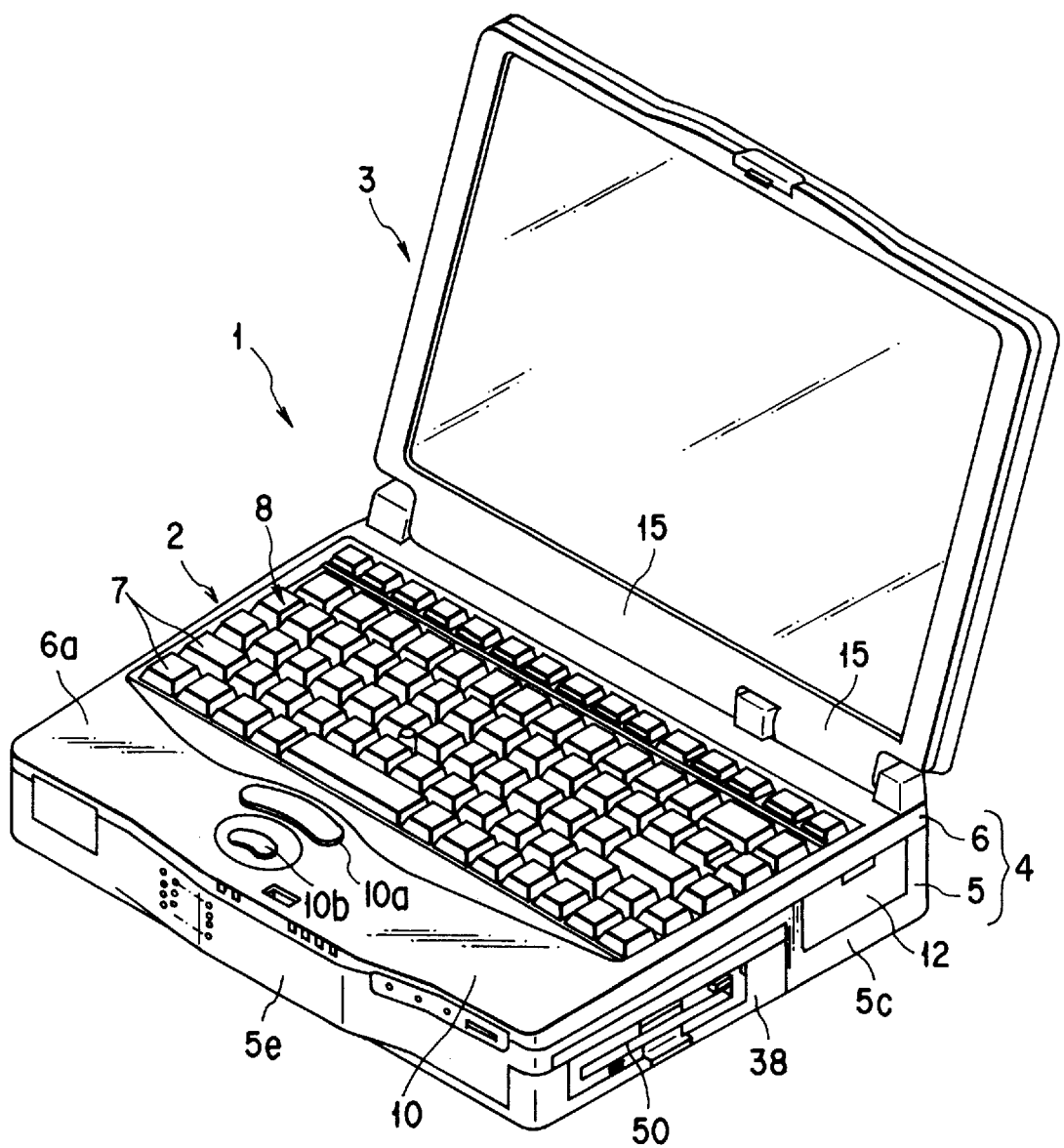
F I G. 1

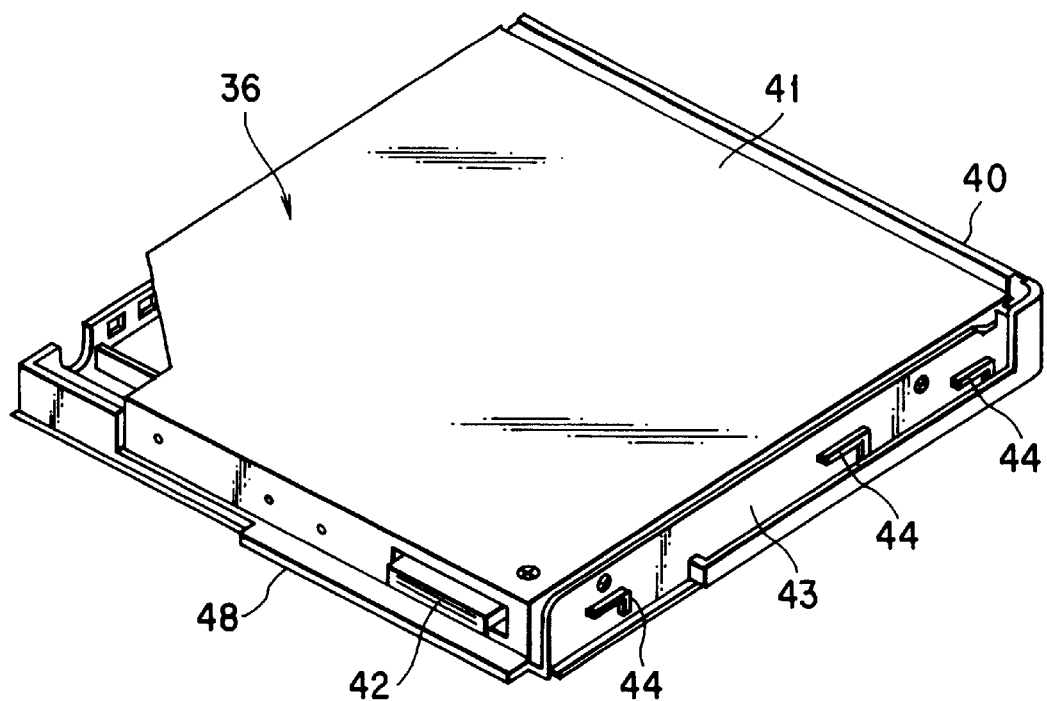
F I G. 5
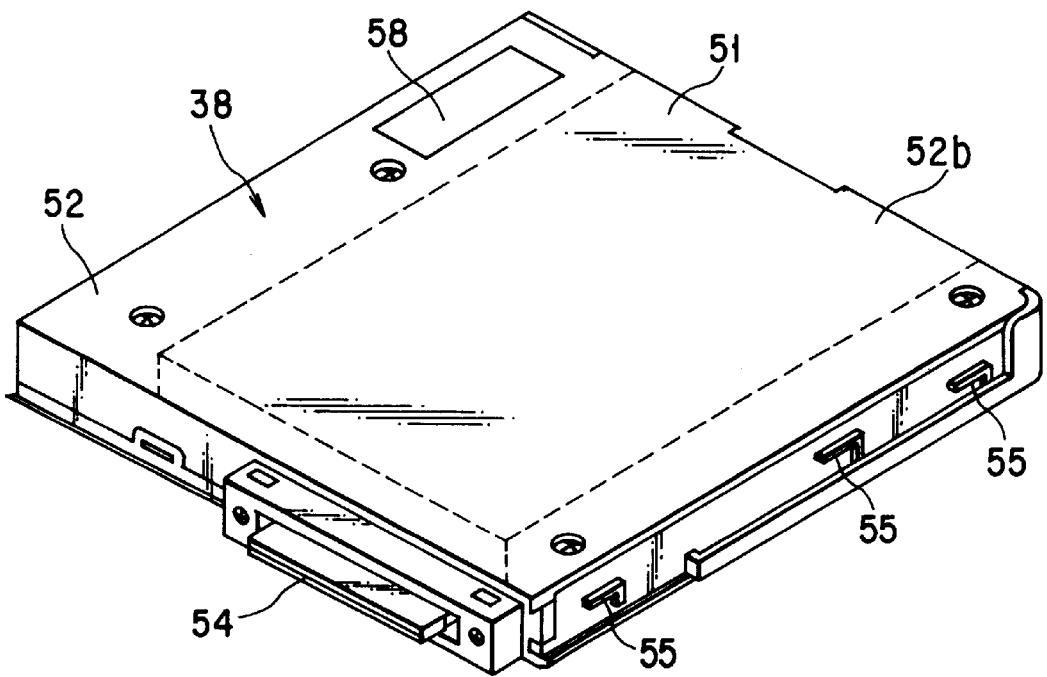
F I G. 6

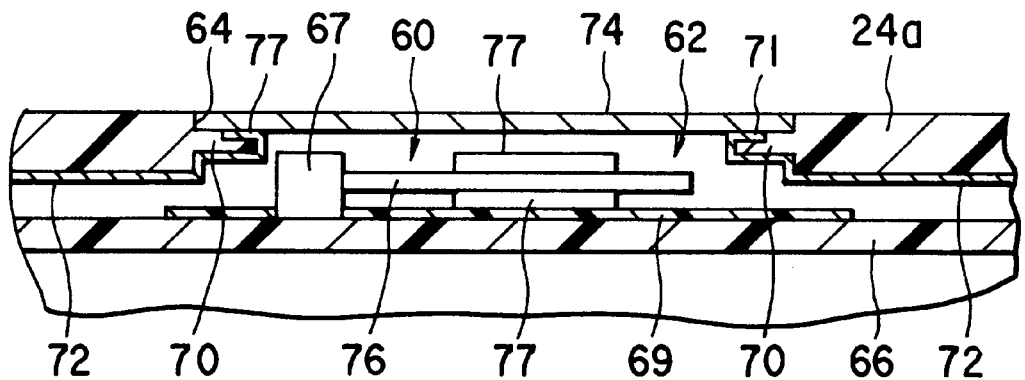
F I G. 8
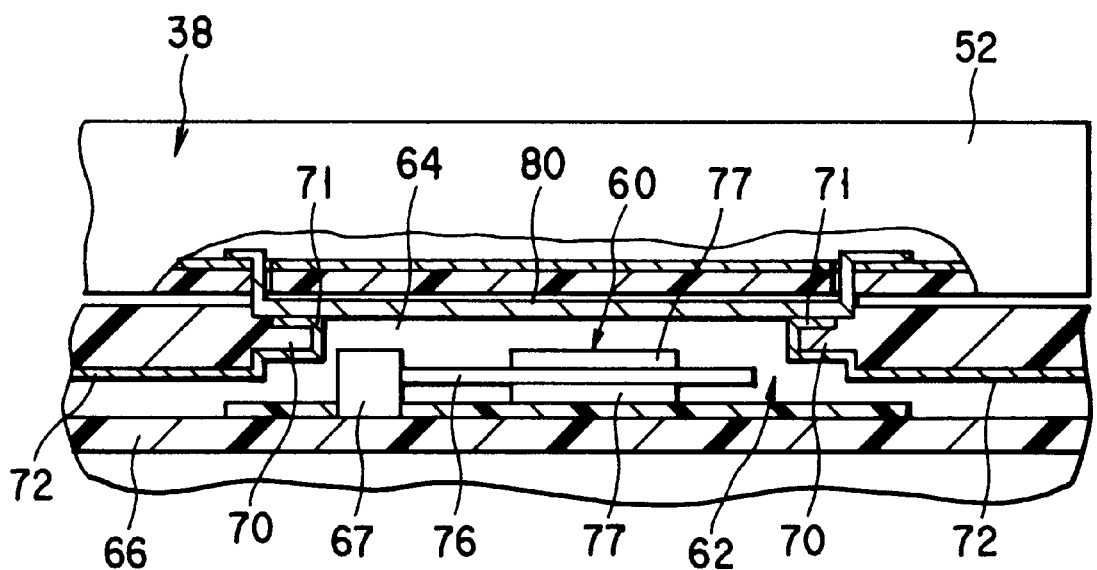
F I G. 9

PORTABLE ELECTRONIC APPARATUS

BACKGROUND OF THE INVENTION

The present invention relates to a portable electronic apparatus such as a notebook computer, and more particularly, to a portable electronic apparatus in which a pack-shaped device is removably set in a housing.

In the field of portable computers in which characters and graphics have conventionally been playing important roles, there is a strong tendency toward the so-called multimedia systems that also use animations, voices, etc. synthetically. Since the animations and voices handled in the multimedia systems involve massive data that surpass character information, the data must be recorded in large-capacity optical disks. Accordingly, there have recently been developed and commercialized portable computers that are mounted with CD-ROM drives for reading data recorded in optical disks.

Further, reductions in size and weight of the housing of portable computers are being expedited for improved portability. These days, for example, A5-size notebook computers are followed by smaller B5-size versions that are spreading gradually.

As the housing is thus reduced in size and weight, the mounting space therein naturally tends to become narrower and narrower. Owing to this spatial restriction, it is difficult to house a CD-ROM drive and a floppy disk drive simultaneously in one housing. Recently, therefore, novel portable computers have been commercialized in which a CD-ROM drive and a floppy disk drive can be alternatively set in the housing. The computer housing is further provided with a removable battery pack, display unit, keyboard, various connectors, slots, etc.

In one such portable computer, a pack holding portion for alternatively holding the CD-ROM drive or floppy disk drive and a battery holding portion for holding the battery pack are formed opening in the side faces and bottom surface of the housing. When the CD-ROM drive or floppy disk drive and the battery pack are set in their corresponding holding portions, they constitute parts of the side faces and bottom surface of the casing, individually.

In the portable computers having the housing thus reduced in size, most of the outer surface of the casing is composed of the pack-shaped device and the battery pack attached to the housing, covers overspreading the connectors and slots, etc. Thus, the area of those portions of the outer surface of the housing itself which are exposed directly to the outside is very narrow.

It is becoming difficult, therefore, to add any other holding portions for holding other devices and optional parts to the outer surface of the housing in an open state. Accordingly, these alternative holding portions cannot be easily formed by utilizing spaces that remain in the casing, so that the space efficiency of the housing cannot be improved without hindrance.

BRIEF SUMMARY OF THE INVENTION

The present invention has been contrived in consideration of these circumstances, and its object is to provide a portable electronic apparatus capable of enjoying a further reduced size and enhanced functions by effectively utilizing the internal space of its housing.

In order to achieve the above object, a portable electronic apparatus according to the present invention comprises a housing including a first holding portion, formed of a recess opening in the outer surface of the housing, and a pack-shaped device packaged as a module having original functions, removably set in the first holding portion, and constituting a part of the outer surface of the housing.

The housing includes an inner wall, defining the pack holding portion and adapted to be exposed when the pack-shaped device is removed from the pack holding portion, and a second holding portion having a loading port opening in the inner wall, for removably holding an optional part.

In the portable electronic apparatus according to the invention, moreover, the loading port of the second holding portion is closed by a removable cover attached to the housing or a shielding plate attached to the pack-shaped device.

According to the portable electronic apparatus constructed in this manner, when the pack-shaped device is removed from the first holding portion, the inner wall of the housing is exposed, so that the loading port of the second holding portion formed in the inner wall becomes accessible. The loading port can be opened to allow the optional part to be loaded into or unloaded from the second holding portion, by removing the cover from the loading port or immediately after the pack-shaped device is removed.

With this arrangement, there is no need to secure any special space for the loading port of the second holding portion in the outer surface of the housing, so that the housing and the whole electronic apparatus can be reduced in size. Also, the optional part can be mounted by effectively utilizing the internal space of the housing, so that the functions of the portable electronic apparatus can be enhanced.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 8 show a portable computer according to an embodiment of the present invention, in which:

FIG. 1 is a perspective view of the computer,

FIG. 2 is a perspective view of the computer taken from the bottom side,

FIG. 3 is a perspective view showing the bottom side of the computer and pack-shaped devices in a disengaged state, FIG. 4 is a perspective view showing the bottom side of the computer in a state wherein the pack-shaped device is removed, FIG. 5 is a perspective view showing the top side of a CD-ROM drive, FIG. 6 is a perspective view showing the top side of a floppy disk drive, FIG. 7 is an exploded perspective view showing the computer with its option holding portion open, and FIG. 8 is a sectional view of the option holding portion of the computer; and FIGS. 9 to 12 show principal parts of a portable computer according to another embodiment of the invention, in which FIG. 9 is a sectional view showing the computer with the floppy disk drive set in its option holding portion, FIG. 10 is a perspective view showing the option holding portion of the computer and the floppy disk drive, FIG. 11 is a perspective view showing a modified form of the CD-ROM drive, and FIG. 12 is a sectional view showing the computer with the CD-ROM drive set in its option holding portion.

DETAILED DESCRIPTION OF THE INVENTION

Figure 2:
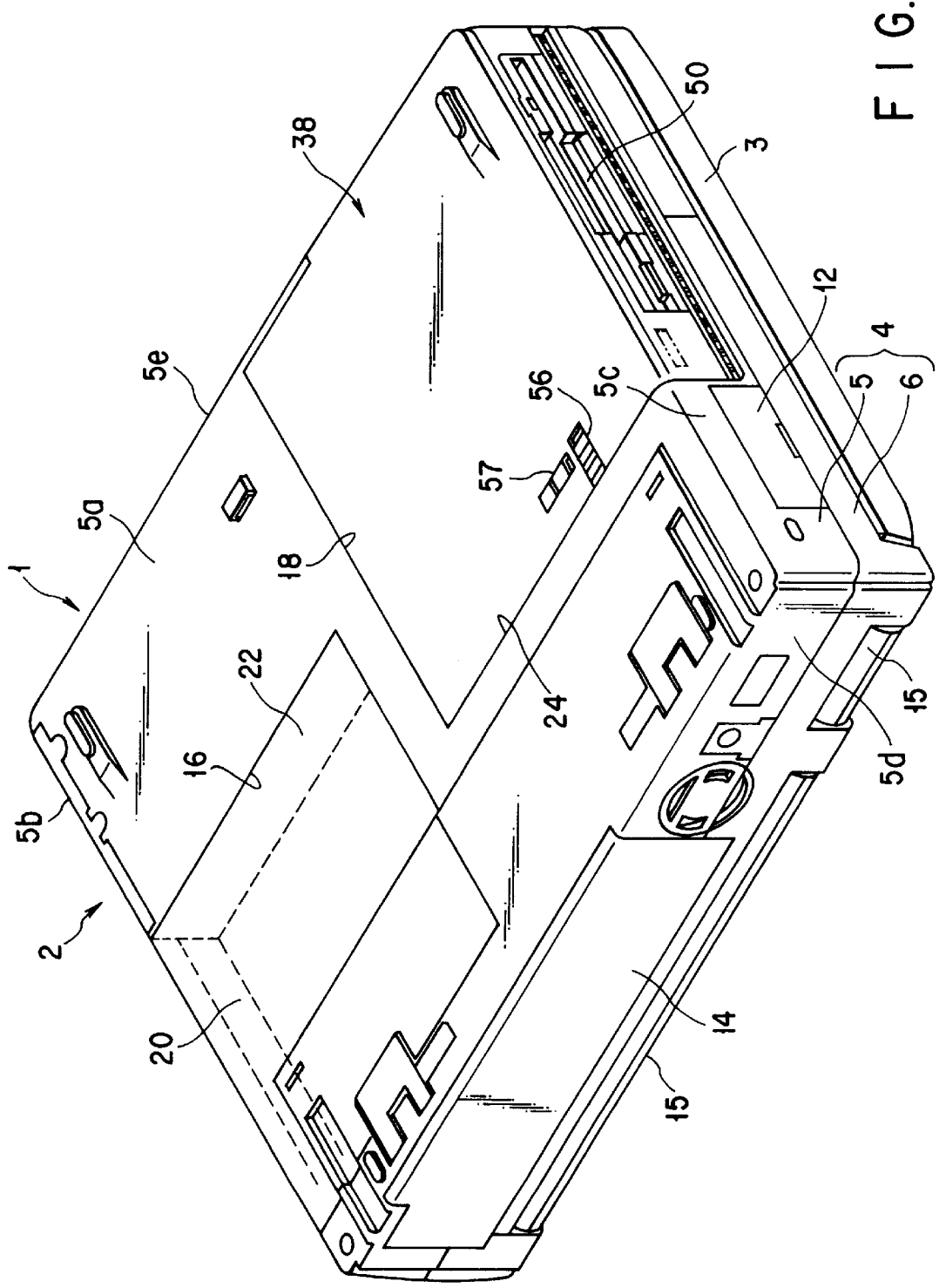

A portable computer according to an embodiment of the present invention will now be described in detail with reference to the accompanying drawings of FIGS. 1 to 8. As shown in FIGS. 1 and 2, a B5-size notebook computer 1 comprises a computer body 2, adapted to be placed on a desk or table, and a display unit 3 rockably supported on the body 2.

The computer body 2 has a plastic housing 4. The housing 4 is formed of a lower housing 5 that opens upward and an upper housing 6 that is removably connected to an open end of the lower housing 5.

The lower housing 5 includes a flat bottom wall 5a, left- and right-hand side walls 5b and 5c continuous with the bottom wall 5a, a rear wall 5d, and a front wall 5e. The side walls 5b and 5c, rear wall 5d, and front wall 5e extend upward from the peripheral edge portion of the bottom wall 5a.

The upper housing 6 is in the form of a plate having a substantially flat top wall 6a. The top wall 6a faces the bottom wall 5a of the lower housing 5, and a side edge portion formed along the peripheral edge of the top wall 6a is continuous with the respective upper ends of the side walls, rear wall, and front wall of the lower housing 5. Thus, the housing 4 is generally in the form of a flat rectangular box.

The rear half portion of the top wall 6a of the upper housing 6 is provided with a keyboard 8 for use as input means that includes a large number of keys 7. The keyboard 8 is a rectangular structure having a width substantially equal to that of the top wall 6a. The front half portion of the top wall 6a constitutes a flat armrest 10, and click switches 10a and 10b for executing and canceling commands are arranged in the central portion of the arm rest.

The display unit 3 is rockably mounted on the rear end of the top wall 6a by means of hinge portions 15. The unit is a flat rectangular structure having plane dimensions substantially equal to those of the computer body 2, and is rockable between an open position in which the keyboard 8 is exposed so as to permit input operation and display viewing, as shown in FIG. 1, and a closed position in which the keyboard 8 is concealed, as shown in FIG. 2. In the closed position, the display unit 3, in conjunction with the computer body 2, forms a notebook-shaped structure.

The rear end portion of the right-hand side wall 5c of the lower housing 5 is fitted with a modem cover 12, which opens and closes a modem loading slot of a modem holding portion (not shown) defined in the housing 4. The rear wall of the housing 4 is provided with a large number of connectors (not shown), such as an RGB connector, RS-232 connector, extension connector, etc. These connectors are overspread by a connector cover 14, which is rockably mounted on the rear wall of the housing 4.

As shown in FIGS. 1 to 4, the lower housing 5 is formed having a battery holding portion 16 and a pack holding portion 18. The battery holding portion 16 is defined by a rectangular recess that opens in the bottom wall 5a and the left-hand side wall 5b at the left-hand end portion of the lower housing 5. A battery pack 20 is removably mounted in the battery holding portion 16. The battery pack 20 is used as a power source for driving the computer 1 when the commercial power source is not available.

The battery pack 20 is provided with a plastic battery case 22 and a plurality of batteries (not shown) housed in the case 22. The battery case 22 has substantially the same size as the battery holding portion 16. When the case 22 is set in the holding portion 16, its bottom surface and one of its side faces constitute a part of the bottom wall 5a of the lower housing 5 and a part of the left-hand side wall 5b, respectively.

The pack holding portion 18 serving as a first holding portion is defined by a rectangular recess 24 that opens in the bottom wall 5a and the right-hand side wall 5c at the right-hand end portion of the lower housing 5. The recess 24 is defined by the inner wall of the lower housing 5. This inner wall includes a rectangular base plate 24a that extends parallel to the bottom wall 5a from the side wall 5c of the lower housing 5, a pair of side plates 24b and 24c that rise upright from those two of the side edges of the base plate 24a which extend in the crosswise direction of the housing 4, individually, so as to be continuous with the bottom wall 5a, and a rear plate 24d that rises upright from that side edge of the base plate 24a which faces the side wall 5c of the lower housing 5 so as to be continuous with the bottom wall 5a.

The base plate 24a, side plates 24b and 24c, and rear plate 24d constitute the bottom wall, side walls, and rear wall of the pack holding portion 18, respectively. Thus, the holding portion 18 is generally in the form of a box that opens toward the lower surface and right-hand side face of the lower housing 5.

The rear plate 24d is formed having an elongate rectangular aperture 30 that extends in the depth direction of the housing 4. A connector 32 is set in the aperture 30 so as to face the pack holding portion 18. The connector 32 is connected to a printed circuit board (not shown) in the lower housing 5.

Each of the opposite side plates 24b and 24c is formed having a plurality of engaging projections 34, e.g., three in number, which are arranged at intervals in the crosswise direction of the housing 4. Further, the side plate 24c has an engaging recess 35 that engages a retaining claw attached to a pack-shaped device, which will be mentioned later. In the pack holding portion 18, a conduction claw 19 protrudes from the front end portion of the base plate 24a on the side of the side plate 24c. The claw 19 conducts to the ground in the housing 4.

Figure 3:
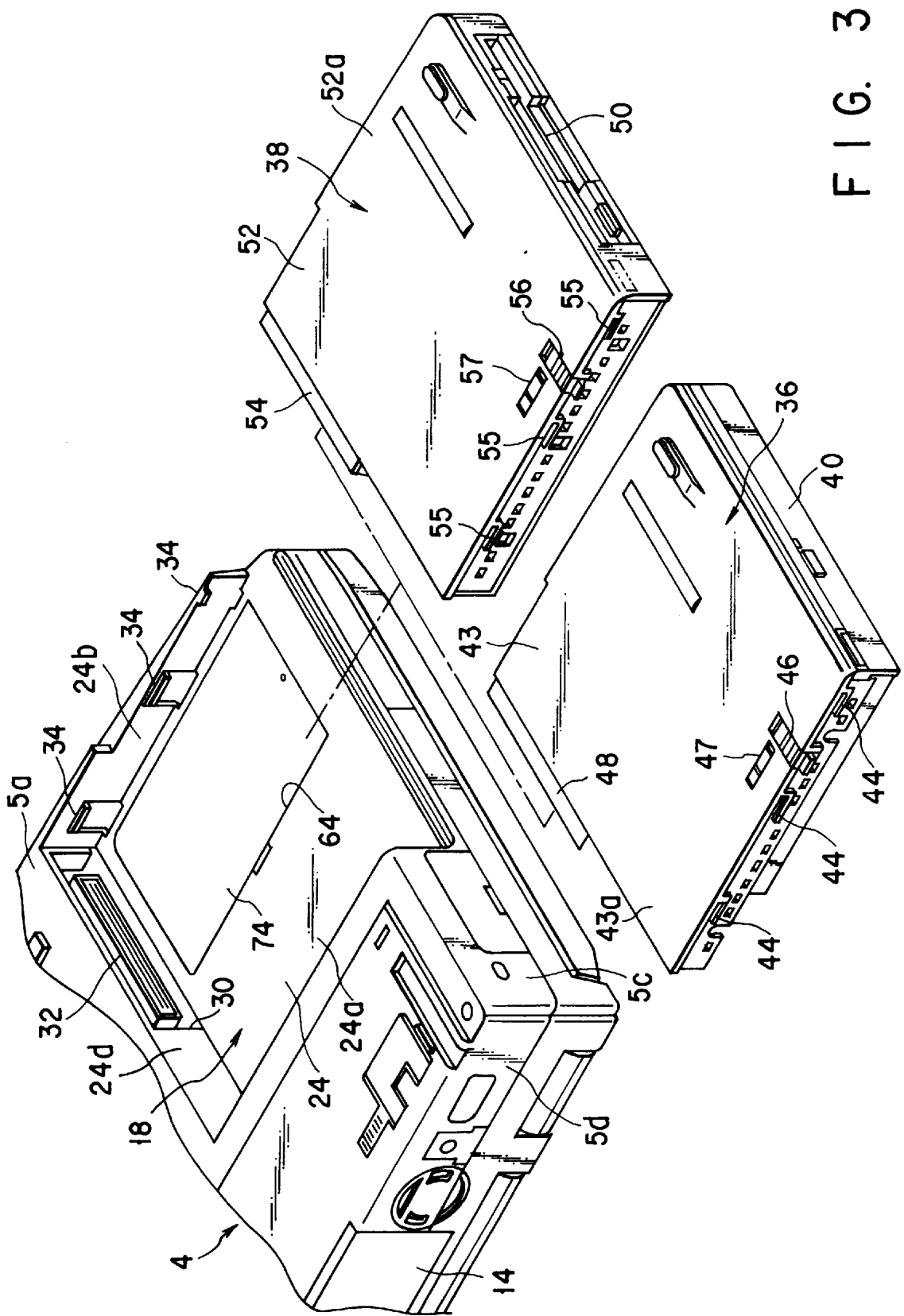
Figure 4:
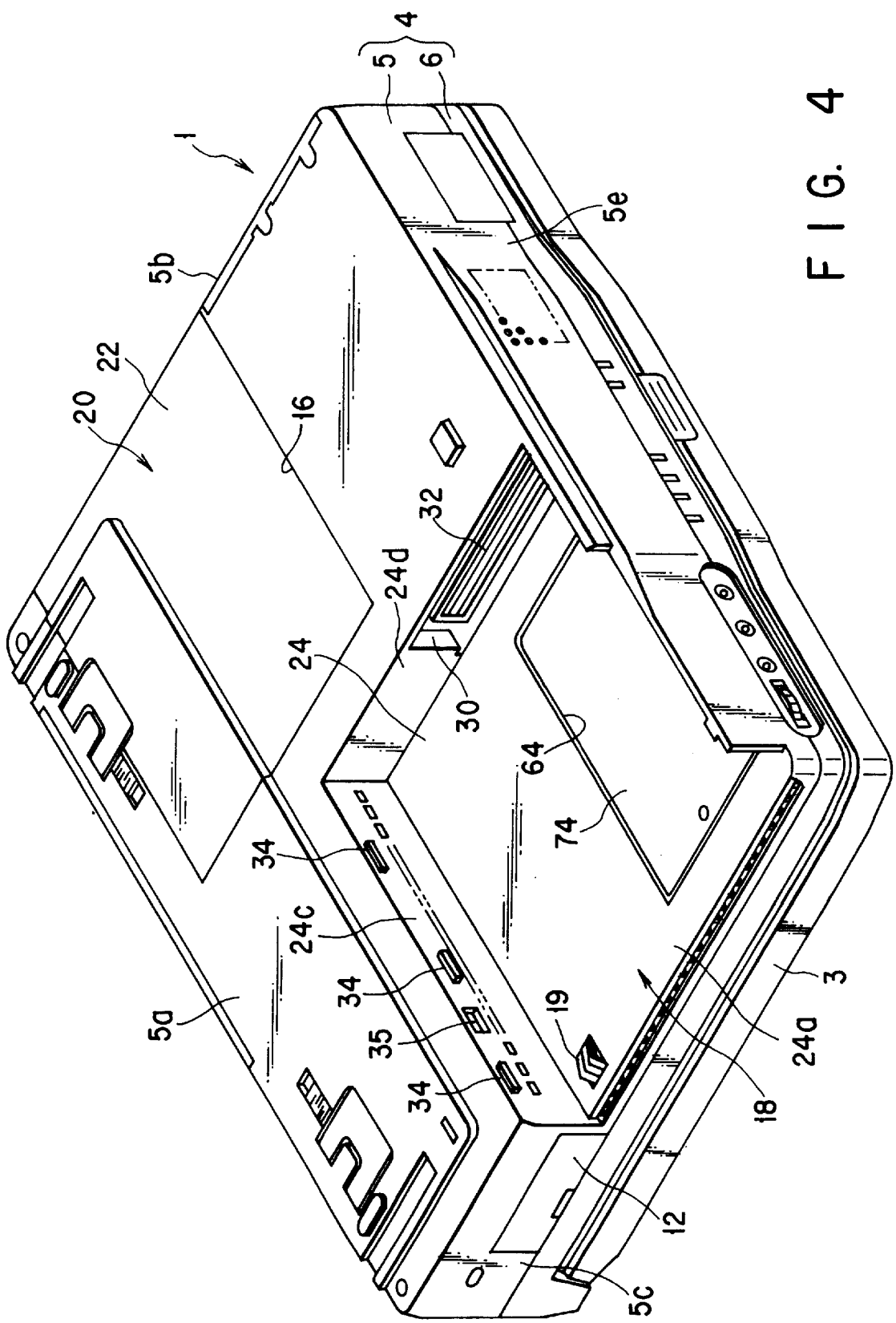

As shown in FIGS. 1 to 3, the pack holding portion 18 can be alternatively removably fitted with a CD-ROM drive 36 or a floppy disk drive 38 serving as the pack-shaped device. These drives 36 and 38 are each packaged as a module having original functions, and have one size such that they can be fitted into the pack holding portion 18.

As shown in FIGS. 3 and 5, the CD-ROM drive 36 comprises a tray 40 for supporting an optical disk and a metallic cabinet 41 that holds the tray 40 like a drawer. The cabinet 41 is in the form of a flat box, and an interface connector 42 is provided on that end portion of the cabinet 41 opposite from the tray 40.

The CD-ROM drive 36 has a plastic cover 43 that overspreads the lower surface and both side faces of the cabinet 41, and is generally in the form of a substantially flat rectangular structure. Three L-shaped engaging claws 44 are formed on each of two opposite side walls of the cover 43. The claws 44 can engage the engaging projections 34 of the pack holding portion 18, individually. A bottom wall 43a of the cover 43 is provided with a retaining claw 46 that can project and retract from one side edge thereof. The claw 46 is urged to project from the side edge by a spring (not shown). When the CD-ROM drive 36 is set in the pack holding portion 18, the claw 46 engages the engaging recess 35 in the side plate 24c of the holding portion 18, thereby holding the drive 36 in position in the holding portion 18.

A locking lever 47 for locking the retaining claw 46 in its projected state is slidably mounted on the bottom wall 43a of the cover 43. Further, a plate-shaped positioning projection 48 protrudes from the rear end of the bottom wall 43a of the cover 43. The projection 48 can be fitted in the aperture 30 in the rear plate 24d of the pack holding portion 18.

After the CD-ROM drive 36 is loaded into the pack holding portion 18 of the lower housing 5 through an aperture thereof, it is pushed in the crosswise direction of the housing 4 toward the left-hand side wall 5b. Thereupon, the engaging claws 44 on the cover 43 engage their corresponding engaging projections 34 of the holding portion 18, and the retaining claw 46 engages the engaging recess 35. At the same time, the interface connector 42 engages the connector 32 of the housing 4.

In this manner, the CD-ROM drive 36 is fixedly held in the pack holding portion 18 and connected electrically to the computer body 2. When the drive 36 is set in the holding portion 18, its bottom surface is flush with the bottom wall 5a of the lower housing 5, and constitutes a part of the wall 5a. Further, the front face of the tray 40 is flush and continuous with the side wall 5c of the lower housing 5, and constitutes a part of the wall 5c.

When the CD-ROM drive 36 is set in the pack holding portion 18, moreover, the metallic cabinet 41 is in contact with the conduction claw 19 that projects into the holding portion 18. Thus, the drive 36 conducts to the ground in the housing 4 through the cabinet 41 and the claw 19.

As shown in FIGS. 3 and 6, on the other hand, the floppy disk drive 38 comprises a device body 51 in the form of a flat box having a floppy disk loading slot 50 in its front face and a plastic outer cover 52 that overspreads the body 51. The cover 52 has substantially the same shape and size as the CD-ROM drive 36. An interface connector 54 is provided on that end portion of the cover 52 opposite from the loading slot 50, and is connected to the device body 51.

Three L-shaped engaging claws 55 are formed on each of two opposite side walls of the outer cover 52. The claws 55 can engage the engaging projections 34 of the pack holding portion 18, individually. A bottom wall 52a of the cover 52 is provided with a retaining claw 56 that can project and retract from one side edge thereof. The claw 56 is urged to project from the side edge by a spring (not shown). When the floppy disk drive 38 is loaded into the pack holding portion 18, the claw 56 engages the engaging recess 35 in the side plate 24c of the holding portion 18, thereby holding the drive 38 in position in the holding portion 18.

A locking lever 57 for locking the retaining claw 56 in its projected state is slidably mounted on the bottom wall 52a of the outer cover 52. Further, a rectangular metallic conduction plate 58 is fixed on the front end portion of a top wall 52b of the cover 52, and conducts to the device body 51 under the cover.

After the floppy disk drive 38 is loaded into the pack holding portion 18 of the lower housing 5 through the aperture thereof, it is pushed in the crosswise direction of the housing 4 toward the left-hand side wall 5b. Thereupon, the engaging claws 55 on the outer cover 52 engage their corresponding engaging projections 34 of the holding portion 18, and the retaining claw 56 engages the engaging recess 35. At the same time, the interface connector 54 engages the connector 32 of the housing 4. In this manner, the floppy disk drive 38 is fixedly held in the pack holding portion 18 and connected electrically to the computer body 2. When the drive 38 is set in the holding portion 18, its bottom surface is flush with the bottom wall 5a of the lower housing 5, and constitutes a part of the wall 5a. Further, the front face of the outer cover 52 is flush and continuous with the side wall 5c of the lower housing 5, and constitutes a part of the wall 5c.

When the floppy disk drive 38 is set in the pack holding portion 18, moreover, the conduction plate 58 fixed on the outer cover 52 is in contact with the conduction claw 19 that projects into the holding portion 18. Thus, the drive 38 conducts to the ground in the housing 4 through the plate 58 and the claw 19.

Figure 7:
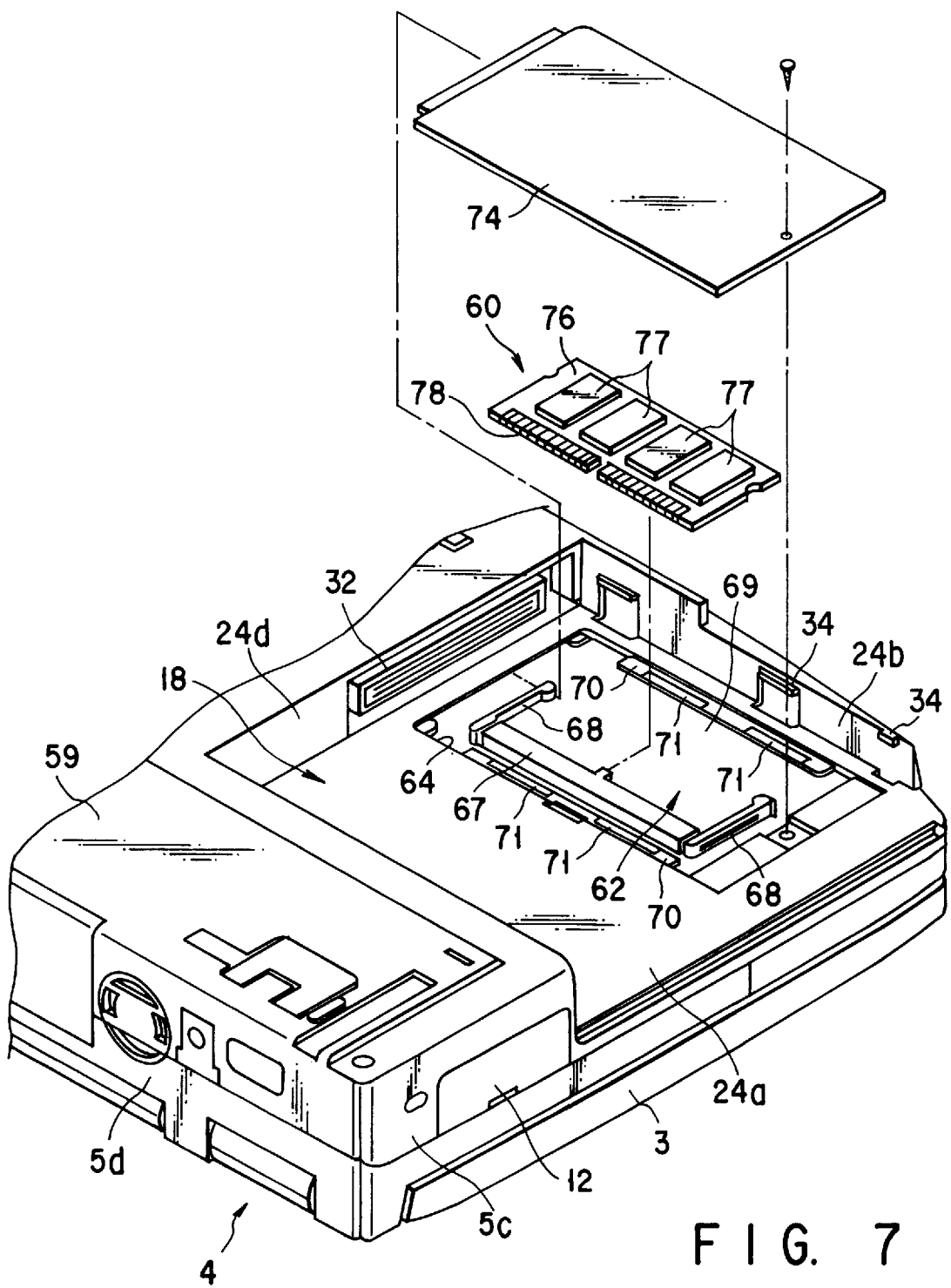

As shown in FIGS. 3, 7 and 8, the housing 4 is provided with an optional part holding portion 62 for holding an expansion memory board 60 as an optional part. This holding portion 62 serving as a second holding portion has a rectangular loading port 64 that opens in the base plate 24a of the pack holding portion 18.

A printed circuit board 66 is located in the housing 4 so as to face the base plate 24a of the pack holding portion 18. The optional part holding portion 62 is a flat rectangular space defined between the circuit board 66 and the base plate 24a. Arranged in the holding portion 62 are a socket 67 fixed on the circuit board 66 and a pair of hooks 68 situated individually on the opposite end sides of the socket. An insulating sheet 69 is laid on the surface of the circuit board 66 so as to face the loading port 64, thus forming the bottom surface of the holding portion 62.

The base plate 24a of the pack holding portion 18 has ribs 70, which project into the loading port 64 from two opposite side edges thereof, and electrically conductive metallic pieces 71 are attached to each rib 70. These pieces 71 conduct to the ground in the housing 4 through a shielding layer 72 that is formed on the inner surface of the lower housing 5.

The loading port 64 of the optional part holding portion 62 is closed by a removable cover 74 that is screwed to the base plate 24a of the pack holding portion 18. The cover 74 has a size corresponding to that of the port 64, and is formed of a rectangular metallic plate. When it closes the port 64, the cover 74 is flush and continuous with the bottom surface of the pack holding portion 18, and constitutes a part of the bottom surface. At the same time, the cover 74 conducts to the ground in the housing 4 through the conductive pieces 71, and functions as a shielding plate.

The expansion memory board 60 comprises a rectangular printed circuit board 76 and memory chips 77 mounted on the opposite surfaces of the board 76, four on each surface. A large number of connecting terminals 78 are formed on one side edge of the circuit board 76 and conduct to the memory chips 77.

In mounting the expansion memory board 60 in the optional part holding portion 62 of the portable computer 1 constructed in this manner, the CD-ROM drive 36 or the floppy disk drive 38 set in the pack holding portion 18 of the housing 4 is first removed from the housing.

In the case where the CD-ROM drive 36 is set in the pack holding portion 18, for example, the portable computer is first switched off, and the retaining claw 46 is then slid to be disengaged from the engaging recess 35 of the pack holding portion 18. In this state, the whole drive 36 is slid toward the side wall 5c of the lower housing 5. Thereupon, the engaging claws 44 of the drive 36 are disengaged from their corresponding engaging projections 34 of the pack holding portion 18, and the interface connector 42 and the connector 32 are disengaged from each other. Thereafter, the CD-ROM drive 36 can be removed from holding portion 18 by being pulled up at right angles to the bottom wall 5a of the lower housing 5.

Subsequently, the cover 74 is removed from the pack holding portion 18 so that the loading port 64 of the optional part holding portion 62 is open. In this state, the side edge portion of the expansion memory board 60 on the side of the connecting terminals 78 is connected to the socket 67 in the optional part holding portion 62, and the hooks 68 are anchored individually to the opposite side edges of the printed circuit board 76 so that the memory board 60 is held in position. Thus, the memory board 60 is housed in the optional part holding portion 62 and connected to the printed circuit board 66 through the socket 67.

Thereafter, the loading port 64 of the option holding portion 62 is closed by means of the cover 74, and the CD-ROM drive 36 or the floppy disk drive 38 is loaded into the pack holding portion 18, whereupon setting the expansion memory board 60 is finished.

According to the portable computer constructed in this manner, the loading port 64 of the optional part holding portion 62 for holding the option opens in the base plate 24a of the pack holding portion 18, which is exposed when the pack-shaped device is removed. Accordingly, there is no need to secure any special space for the loading port 64 in the outer surface of the housing 4 itself, so that the housing 4 and the whole computer 1 can be reduced in size. At the same time, the internal space of the housing 4 can be utilized effectively, so that the packing density can be improved. Thus, the personal computer can be miniaturized as a whole.

Since the loading port 64 of the option holding portion 62 is closed by the cover 74 and additionally covered by the pack-shaped device in the pack holding portion 18, moreover, the holding portion 62 can be prevented from opening unexpectedly. Thus, the optional part can be protected against damage, and dust or other unacceptable matter can be prevented from getting into the housing 4.

Since the cover 74 that closes the loading port 64 of the optional part holding portion 62 is formed of a metallic plate, furthermore, it can be made thinner than a plastic cover, so that the coefficient of space utilization can be improved further. Also, the cover 74 can be utilized as a shielding plate when it is caused to conduct to the ground in the housing 4. Thus, it can protect the optional part set in the optional part holding portion 62 and prevent wrong operation.

Figure 10:
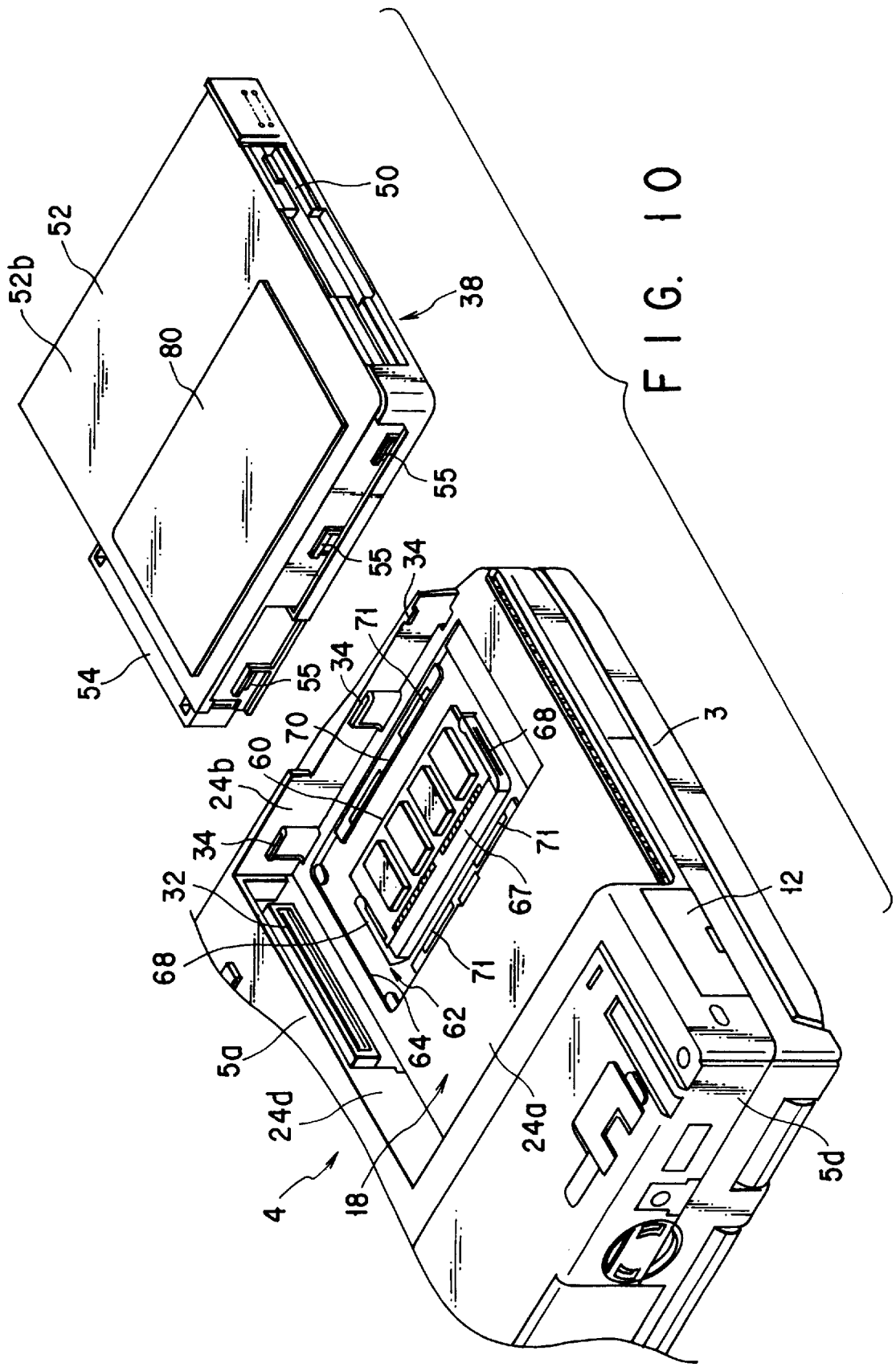

FIGS. 9 and 10 show principal parts of a portable computer according to another embodiment of the present invention. According to this second embodiment, the cover 74 that closes the loading port 64 of the optional part holding portion 62 is omitted, and instead, the pack-shaped device set in the pack holding portion 18 is used to close the port 64.

More specifically, a rectangular shielding plate 80 having a size corresponding to the loading port 64 is fixed on the top wall 52b of the outer cover 52 of the floppy disk drive 38, and conducts to the device body. When the drive 38 is loaded into the pack holding portion 18, the shielding plate 80 closes the loading port 64, and conducts to the ground in the housing 4 through the conductive pieces 71.

According to this arrangement, the shielding plate 80 can double as a cover for the loading pit 64 and also as a shield for the optional holding portion 62. At the same time, the floppy disk drive 38 can conduct to the ground in the housing 4 through the plate 80.

Figure 11:
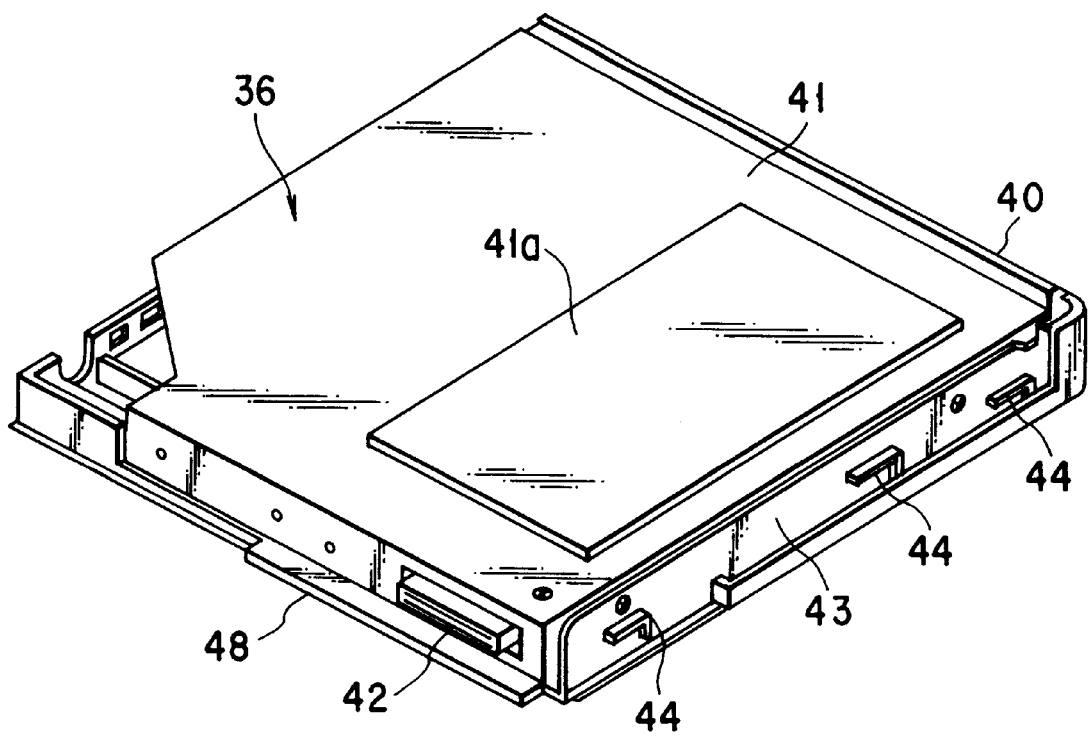
Figure 12:
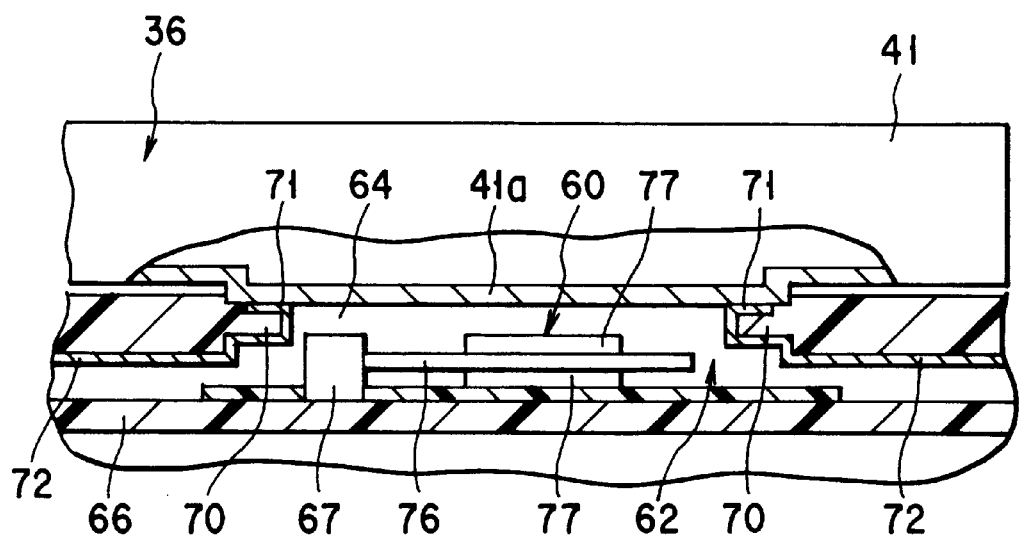

In the case where the CD-ROM drive 36 is used as the pack-shaped device, the metallic cabinet 41 of the drive 36 that faces the loading port 64 of the optional part holding portion 62 can be used both as a cover and a shielding plate. As shown in FIGS. 11 and 12, in this case, that portion of the cabinet 41 which faces the port 64 may be in the form of a rectangular projection 41a having a size corresponding to the port 64. With this arrangement, the loading port 64 can be securely closed by means of the cabinet 41, and the cabinet 41 can be caused to conduct to the conductive pieces 71 of the housing 4 without fail.

Thus, according to the present embodiment, the same effects of the foregoing embodiment can be ensured, and the loading port 64 of the option holding portion 62 can be opened or closed as the pack-shaped device is unloaded from or loaded into the pack holding portion 18, resulting in improvement in operating efficiency.

It is to be understood that the present invention is not limited to the embodiments described above, and that various changes and modifications may be effected therein by one skilled in the art without departing from the scope or spirit of the invention. For example, the pack-shaped device is not limited to the CD-ROM drive or floppy disk drive described above, and may be any other suitable device, such as a hard disk drive, battery pack, etc.

Further, the optional part holding portion may be designed so that its loading port opens in the bottom wall of the battery holding portion 16. Furthermore, the option is not limited to the expansion memory board, and may be any other similar component, such as a sub-battery, memory card, spare CPU, etc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A portable electronic apparatus comprising:
    a housing including an inner wall defining a recessed first holding portion opening in the outer surface of the housing, a second holding portion having a loading port opening in the first holding portion and capable of removably holding an optional part, and a shielding layer formed on the inner surface of the housing;
    a pack-shaped device packaged as a module having original functions, removably set in the first holding portion, and constituting a part of the outer surface of the housing, the pack-shaped device including a shielding plate for closing and electrically shielding the loading port when the pack-shaped device is set in the first holding portion, the shielding layer of the housing being electrically connected to shielding plate.

2. A portable electronic apparatus according to claim 1, wherein the pack-shaped device includes a device body and a plastic cover overspreading the device body, and the shielding plate is fixed on the outer surface of the cover.

3. A portable electronic apparatus according to claim 1, wherein the pack-shaped device includes a metallic cabinet constituting the shielding plate.

4. A portable electronic apparatus comprising:

a housing including a recessed first holding portion opening in the outer surface of the housing; and a pack-shaped device packaged as a module having original functions, removably set in the first holding portion, and constituting a part of the outer surface of the housing, the housing including an inner wall defining the first holding portion and adapted to be exposed when the pack-shaped device is removed from the first holding portion, a second holding portion having a loading port opening in the first holding portion for removably holding an optional part, a shielding layer formed on the inner surface of the housing, and a removable metallic cover closing the loading port and electrically connected to the shielding layer.

5. A portable electronic apparatus according to claim 4, wherein the housing is in the form of a rectangular box having a bottom wall and side walls continuous with the bottom wall, the first holding portion is defined by a rectangular recess opening in the bottom and side walls, the inner wall of the housing includes a base plate extending substantially parallel to the bottom wall and constituting the bottom of the first holding portion, and the loading port of the second holding portion opens in the base plate.

6. A portable electronic apparatus comprising:

a housing having an outer surface including a bottom wall, and a recessed first holding portion opening in the outer surface of the housing; and a pack-shaped device packaged as a module having original functions, removably set in the first holding portion, and constituting a part of the outer surface of the housing, the housing including:

an inner wall, having a base plate which extends substantially in parallel with the bottom wall of the housing, defining the first holding portion and adapted to be exposed when the pack-shaped device is removed from the first holding portion, a second holding portion having a loading port opening in the first holding portion through the base plate, for removably holding an optional part, a shielding layer formed on the inner surface of the housing, a removable cover closing the loading port and constituting a part of the base plate, the removable cover being electrically connected to the shielding layer.

* * * * *